United States Patent
Crivat et al.

(10) Patent No.: US 7,451,137 B2
(45) Date of Patent: Nov. 11, 2008

(54) USING A ROWSET AS A QUERY PARAMETER

(75) Inventors: Ioan Bogdan Crivat, Redmond, WA (US); C James MacLennan, Redmond, WA (US); Raman S Iyer, Redmond, WA (US); Marius Dumitru, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 300 days.

(21) Appl. No.: 11/069,121

(22) Filed: Feb. 28, 2005

(65) Prior Publication Data

US 2006/0010112 A1    Jan. 12, 2006

Related U.S. Application Data

(60) Provisional application No. 60/586,644, filed on Jul. 9, 2004.

(51) Int. Cl.
*G06F 17/30* (2006.01)
(52) U.S. Cl. .............................. 707/4; 707/103 R; 707/2
(58) Field of Classification Search ...................... 707/3, 707/4, 5
See application file for complete search history.

(56) References Cited

U.S. PATENT DOCUMENTS

| | | | |
|---|---|---|---|
| 5,293,615 A | 3/1994 | Amada | |
| 5,767,854 A | 6/1998 | Anwar | |
| 5,855,018 A | 12/1998 | Chor et al. | |
| 5,878,423 A | 3/1999 | Anderson et al. | |
| 5,930,762 A | 7/1999 | Masch | |
| 5,969,974 A | 10/1999 | Vandenbelt et al. | |
| 5,970,482 A | 10/1999 | Pham et al. | |
| 5,970,493 A | 10/1999 | Shoup et al. | |
| 5,974,572 A | 10/1999 | Weinberg et al. | |
| 6,006,223 A | 12/1999 | Agrawal et al. | |
| 6,078,918 A * | 6/2000 | Allen et al. | 707/6 |
| 6,108,647 A | 8/2000 | Poosala et al. | |
| 6,430,545 B1 | 8/2002 | Honarvar et al. | |
| 6,470,352 B2 | 10/2002 | Yaginuma et al. | |
| 6,477,538 B2 | 11/2002 | Yaginuma et al. | |
| 6,651,055 B1 | 11/2003 | Kilmer et al. | |
| 6,662,195 B1 | 12/2003 | Langseth et al. | |

(Continued)

OTHER PUBLICATIONS

Blakeley, Jose A., "Data Access for the Masses through OLE DB", SIGMOD '96, ACM, Jun. 1996, p. 161-172.*

(Continued)

*Primary Examiner*—Cam Y T Truong
(74) *Attorney, Agent, or Firm*—Amin, Turocy & Calvin, LLP

(57) ABSTRACT

Architecture that facilitates syntax processing for data mining statements. The system includes a syntax engine that receives as an input a query statement which, for example, is a data mining request. The statement can be generated from many different sources, e.g., a client application and/or a server application, and requests query processing of a data source (e.g., a relational database) to return a result set. The syntax engine includes a binding component that converts the query statement into an encapsulated statement in accordance with a predefined grammar. The encapsulated statement includes both data and data operations to be performed on the data of the data source, and which is understood by the data source. An execution component processes the encapsulated statement against the data source to return the desired result set.

12 Claims, 10 Drawing Sheets

U.S. PATENT DOCUMENTS

| | | | |
|---|---|---|---|
| 6,675,356 | B1 | 1/2004 | Adler et al. |
| 6,721,715 | B2 | 4/2004 | Nemzow |
| 6,853,994 | B1 | 2/2005 | Gupta |
| 6,973,491 | B1 | 12/2005 | Staveley et al. |
| 6,990,480 | B1 | 1/2006 | Burt |
| 7,062,757 | B2 | 6/2006 | Honarvar et al. |
| 7,076,475 | B2 | 7/2006 | Honarvar |
| 7,181,440 | B2 | 2/2007 | Cras et al. |
| 7,222,130 | B1 | 5/2007 | Cras et al. |
| 2001/0011241 | A1 | 8/2001 | Nemzow |
| 2001/0054034 | A1 | 12/2001 | Arning et al. |
| 2002/0032609 | A1 | 3/2002 | Wilkman |
| 2002/0111934 | A1 * | 8/2002 | Narayan ........................ 707/1 |
| 2003/0023463 | A1 | 1/2003 | Dombroski et al. |
| 2003/0046303 | A1 | 3/2003 | Chen et al. |
| 2004/0111428 | A1 | 6/2004 | Rajan et al. |
| 2005/0165733 | A1 | 7/2005 | Strovink |
| 2005/0222972 | A1 | 10/2005 | Mishra et al. |
| 2006/0010157 | A1 | 1/2006 | Dumitrascu et al. |
| 2007/0118501 | A1 | 5/2007 | Yan |

OTHER PUBLICATIONS

OLE DB for Data Mining Specification Version 1.0. Microsoft Corporation, Jul. 2000. 133 pgs.

Microsoft OLE DB for OLAP: Programmer's Reference, Microsoft Corporation, Dec. 1998.

* cited by examiner

USING A ROWSET AS A QUERY PARAMETER

CROSS-REFERENCE TO RELATED APPLICATIONS

This application claims the benefit of U.S. Provisional Patent Application Ser. No. 60/586,644, entitled "SYSTEMS AND METHODS THAT FACILITATE SOLVING BUSINESS PROBLEMS" filed Jul. 9, 2004; and is related to U.S. patent application Ser. No. 11/054,803 entitled "CUBE UPDATE TOOL" filed on Feb. 10, 2005, and U.S. patent application Ser. No. 11/054,302 entitled "SYSTEM THAT FACILITATES MAINTAINING BUSINESS CALENDARS" filed on Feb. 9, 2005. The entireties of the above-noted applications are incorporated by reference herein.

TECHNICAL FIELD

This invention is related to data mining of databases, and more specifically, to statements and parameters of query languages utilized with data mining.

BACKGROUND OF THE INVENTION

The evolution of computers with respect to memory storage expansion and processing capabilities has enabled massive amounts of data to be accumulated and analyzed by complex and intelligent algorithms. For instance, given an accumulation of data, algorithms can analyze such data and locate patterns therein. These patterns can then be extrapolated from the data, persisted as content of a data mining model or models, and applied within a desired context. With the evolution of computers from simple number-crunching machines to sophisticated devices, services can be provided that range from video/music presentment and customization to data trending and analysis.

Data mining involves searching through large amounts of data to uncover patterns and relationships contained therein. In the data mining world, there are at least two operations that are performed with data indicated by the client. These operations are training (finding patterns in client data) and prediction (applying such patterns to infer new/missing knowledge about client data). For example, data mining can be used to explore large detailed business transactions such as credit card transactions to determine the most influential factors common to non-profitable customers.

One way of accomplishing this is to employ a single monolithic application that loads the data, and retains the data in a memory for the prediction engine. That is, the prediction engine is trained using the in-memory data. A score can also be associated with the in-memory data. Thus, the application is essentially a black box that receives the data as input, and includes the logic to generate numbers. The output can be a set of rules that defines the resulting data, and/or a score that is associated with each entry of the in-memory data. This configuration is most suitable for client machines, since use on a server would impact performance.

Traditionally, developers of embedded and/or pipeline data mining applications were required to transfer their data to a relational data source, execute the training and/or prediction statements against the relational data source, and then delete the data from the relational data source. In addition to the extra complexity and impact on system performance that accompanies such an operation, the data source approach was also raising security issues in certain scenarios. If the connection to the data mining server is performed over an HTTP (HyperText Transport Protocol) connection (or some other connection from outside the server's domain), then finding a relational data source that is accessible both to the server and the client application can be a problem.

In one conventional data mining engine that processes relational data (e.g., SQL Server data mining), the data can only be fetched from relational data sources. Hence, a data mining statement involving external data is composed using an OPENROWSET function, which allows description of a relational statement and a data source against which it is executed. Following is an example of a conventional training statement:

```
INSERT INTO [Model] ('A', 'B')
OPENROWSET
(
    'SQLOLEDB.1',
    'Provider = SQLOLEDB.1; Data Source=MyRBMSServer; Initial Catalog=MyCatalog;'
    'SELECT a, b FROM MyTable'
)
```

Users are required to store their data in a relational data source, and then point the data mining server to that relational data. This means that different kinds of applications are employed to arrive at an enhanced set of data. Moreover, it is extremely problematic to train a mining model to output a set of rules and/or scoring, unless the data is cached or staged first in the relational database. As indicated supra, this is time consuming and raises security issues. Additionally, this now involves a third entity—the relational data source, where both of the other players—the client that has the data and an analysis server need to have access. The client has to have the capability to write to the relational data source, and the server needs the capability to read from the relational data source. Thus, there is a substantial unmet need in the art for an improved data mining mechanism.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Some of the existing statements in the data mining query language allow for the description of queries to be executed against relational database management systems for purposes such as training mining models and performing batch predictions.

In view thereof, the invention disclosed and claimed herein, in one aspect thereof, comprises a new syntax that can be used in statements that allow data to be pushed to an analysis service without requiring a relational data source. In one example, an OPENROWSET description of a relational connection is replaced with syntax that pushes both the data and the statement parameter for operating on the data to the server. The invention extends the existing data mining syntax by allowing the data to be in-lined in the statement queries with rowsets as parameters, rather than fetched by the server from a relational data source.

In another aspect, the invention also includes an OLE DB (OLE for Databases) implementation for support of such rowset parameters, and server side support for queries that contain rowset parameters. OLE DB is a set of COM-based interfaces that expose data from a variety of sources. OLE DB interfaces provide applications with uniform access to data stored in diverse information sources, or data stores. The implementation follows the OLE DB specification in describing the parameters and using the parameters in a statement (in client applications).

In yet another aspect of the subject invention, this technology is essential for developers of embedded data mining applications, because it allows use in training/predictions data that is not included in a relational data source.

In still another aspect thereof, the invention is also essential for pipeline applications where the data to be transmitted to the server is built on-the-fly and is usually stored in memory. The pipelined implementation can utilize transforms employed in memory to process the data for both training and prediction. When data is being input for training, the output of the training transform is being processed for prediction.

In another aspect thereof, an artificial intelligence component is provided that employs a probabilistic and/or statistical-based analysis to prognose or infer an action that a user desires to be automatically performed.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
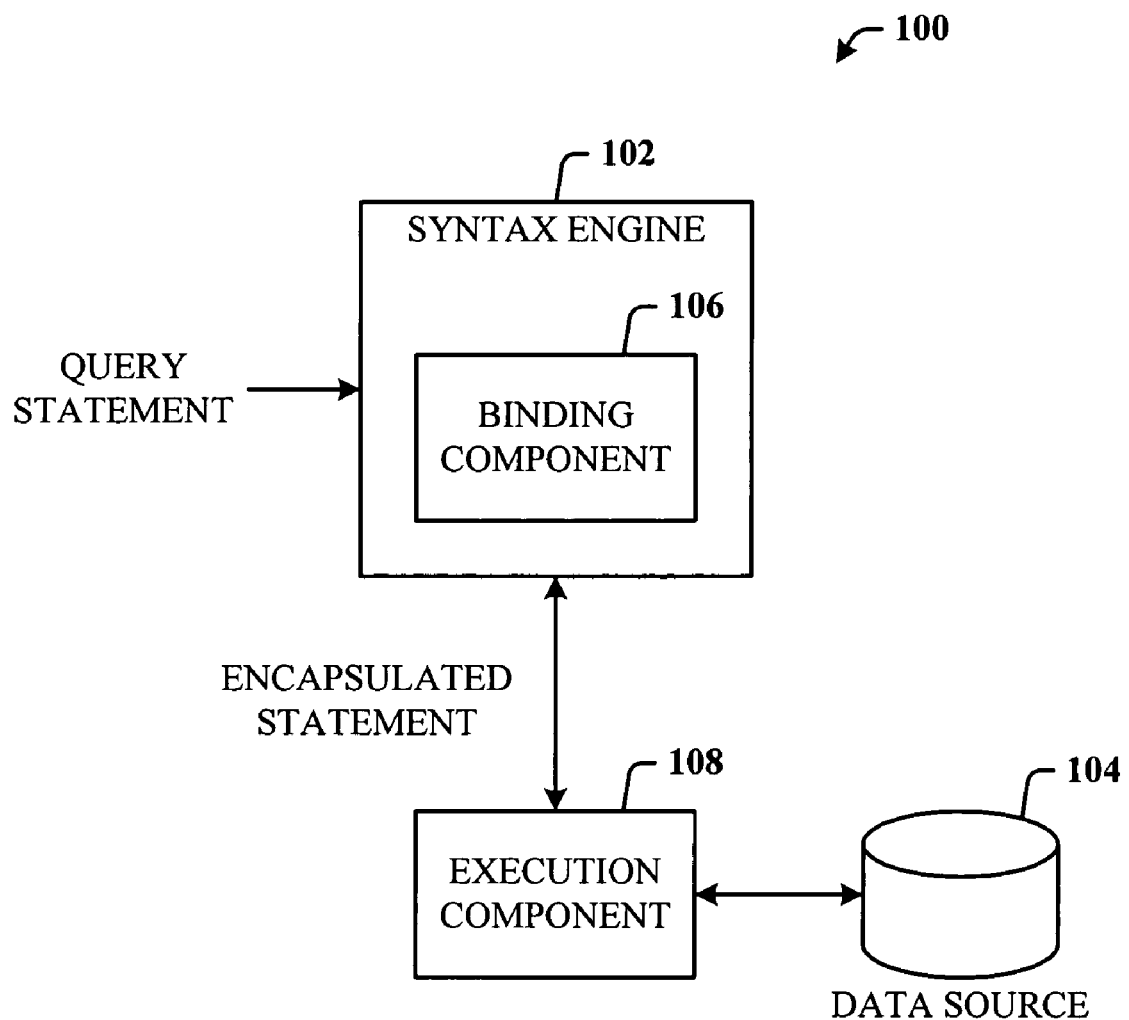
FIG. 1 illustrates a system that facilitates syntax processing for data mining in accordance with the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates syntax processing for data mining in accordance with the subject invention. The system 100 includes a syntax engine 102 that receives as an input a query statement which, for example, is a data mining request. The statement can be generated from many different sources, e.g., a client application and/or a server application, and requests query processing of a data source 104 (e.g., a relational database) to return a result set. The syntax engine 102 includes a binding component 106 that converts the query statement into an encapsulated statement in accordance with a predefined grammar. The binding component 106 processes the query with embedded rowset parameters and binds the appropriate data structures to sections of the data represented by the parameters. The encapsulated statement includes both data and data operations to be performed on the data of the data source 104, and which is understood by the data source 104. An execution component 108 processes the encapsulated statement against the data source 104 to return the desired result set. Note that in this implementation, the execution component 108 is external to the syntax engine 102; however, it need not be.

Figure 2:
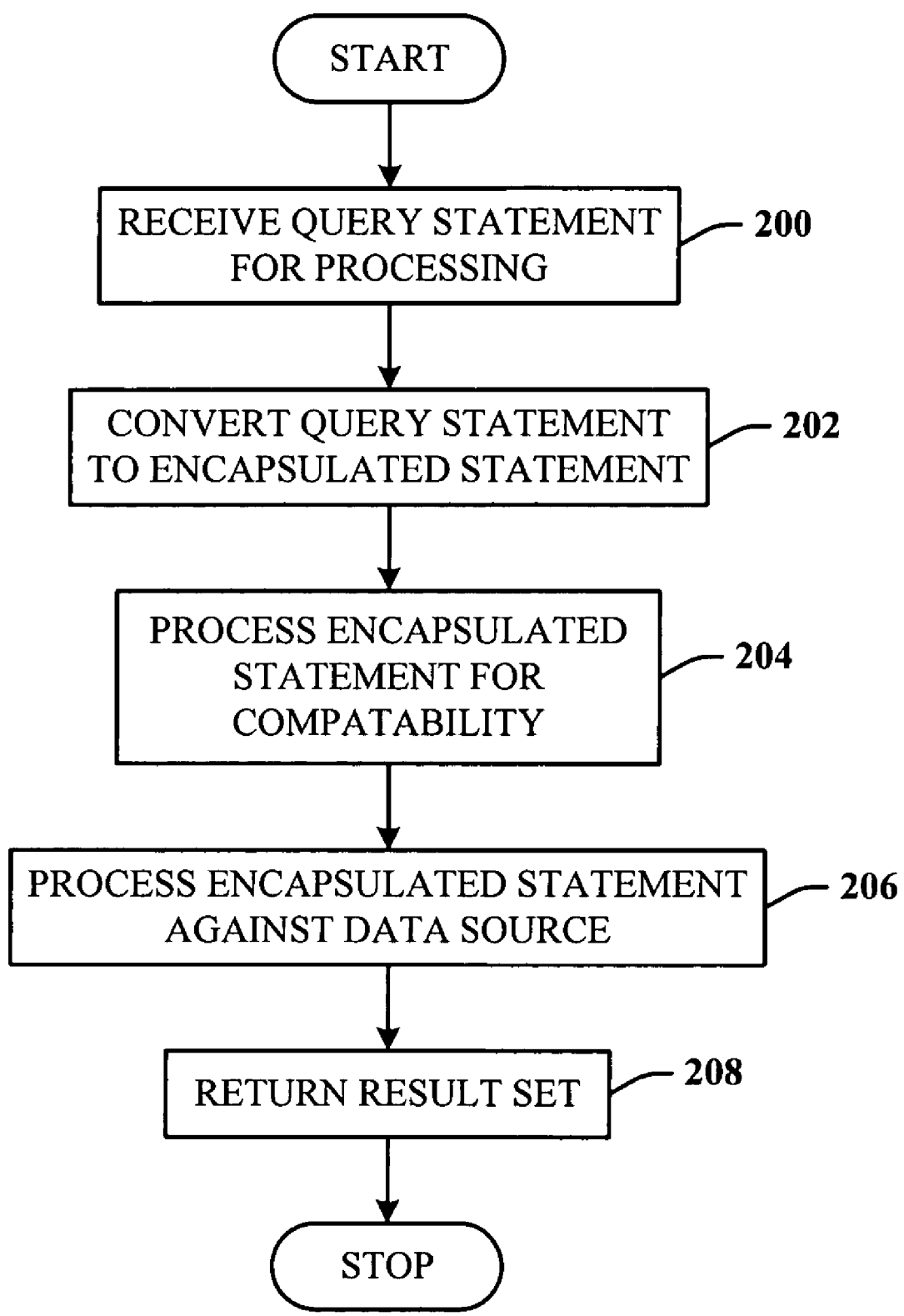
FIG. 2 illustrates a methodology of query statement processing in accordance with the invention.

FIG. 2 illustrates a methodology of query statement processing in accordance with the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 200, a query statement is received for processing. At 202, the query statement is converted to an encapsulated statement by processing the query with embedded rowset parameters and binding the appropriate data structures to sections of the data represented by the parameters. At 204, the encapsulated statement is processed for integrity, and compatibility with the data source. At 206, the encapsulated statement is then processed against the data source. The result set is then returned, as indicated at 208.

Figure 3:
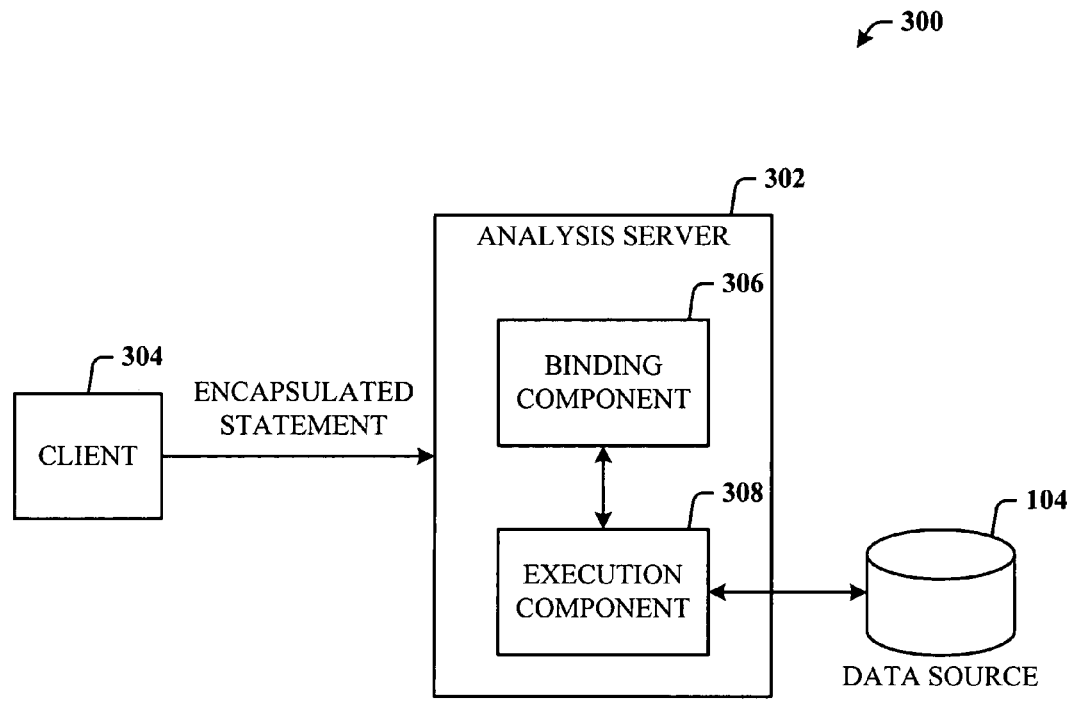
FIG. 3 illustrates an analysis services system that employs data mining in accordance with the invention.

FIG. 3 illustrates an analysis services system 300 that employs data mining in accordance with the invention. The system 300 includes an analysis services server 302 that communicates with a client 304, which client 304 facilitates generation of the encapsulated query statement from the query statement. The encapsulate query statement is received at the server 302, and ultimately processed against the data source 104. In this particular implementation, the server 302 includes a binding component 306 (similar to binding component 106) that interrogates the encapsulated statement for a list of parameters contained therein. Once the desired parameter or parameters are extracted, the parameter(s) are passed to an execution component 308, which in this case, is included in the server 302. The statements parameters are then executed against the data source 104 to return the desired result set. The data source 104 processes the statement independent of any knowledge required of the statement's origin.

Figure 4:
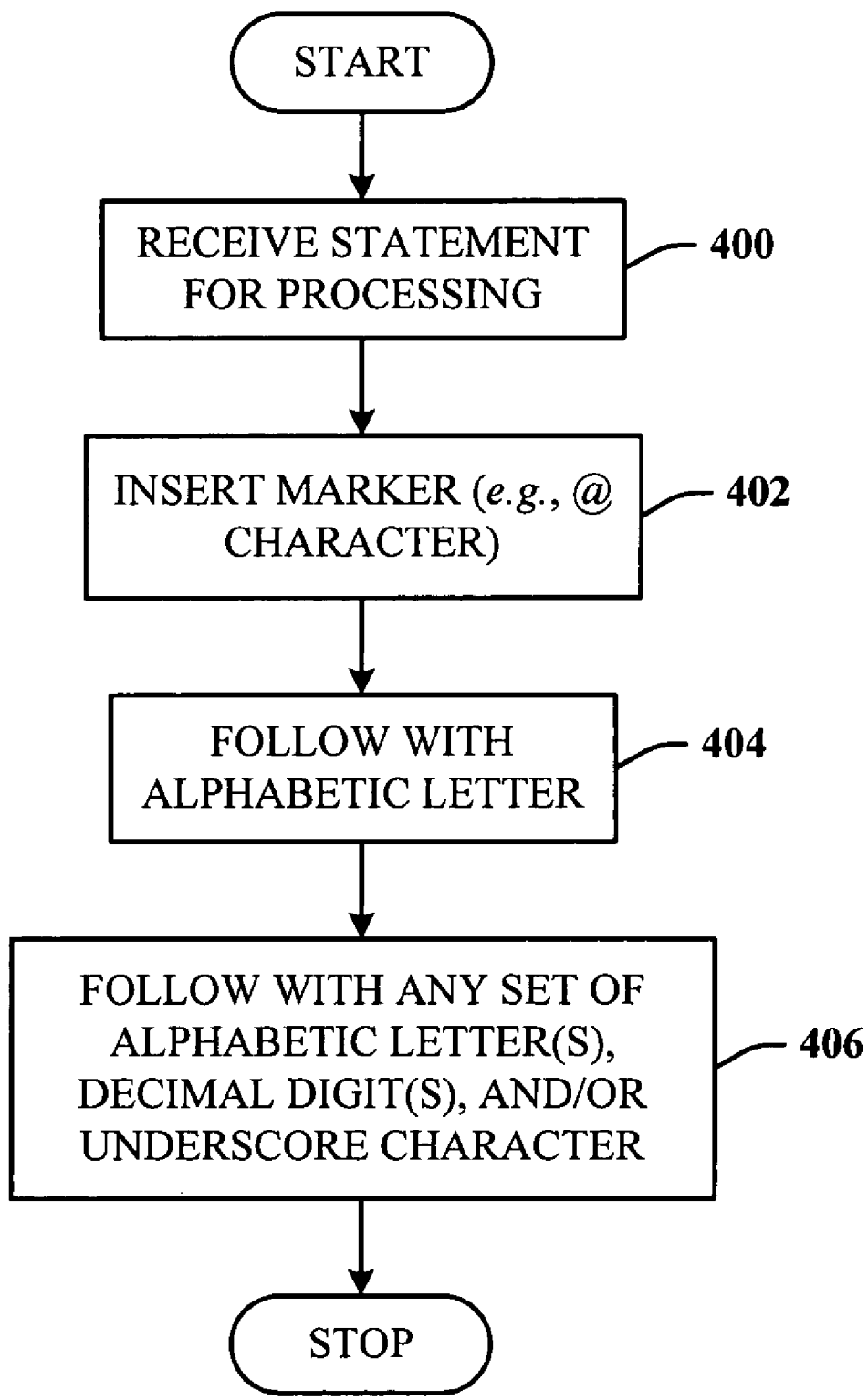
FIG. 4 illustrates a methodology of rowset query parameterization for a relational data source in accordance with the invention.

FIG. 4 illustrates a methodology of rowset query parameterization for a relational data source in accordance with the invention. The novel syntax substitutes in the query statement the rowset followed by a unique identifier that is prefixed by a marker character (e.g., an ampersand character "@"). The identifier can be composed of letters of the English alphabet, decimal digits and the underscore character (""). In one implementation, the first character must be a letter of the English alphabet. In another implementation, the first character can be any character. Utilizing the novel syntax described herein on the conventional statement provided above, one example statement is the following:

INSERT INTO [Model] ('A', 'B') @RowsetIdentifier

Accordingly, there is provided a methodology where, at 400, a statement is received for processing. At 402, a marker character is inserted (e.g., an ampersand character "@"). At 404, the marker character is followed by an alphabetic letter. Thereafter, the alphabetic letter can be followed by any single character or combination of characters that include an alphabetic letter, a decimal digit, and/or an underscore character (" "), as indicated at 406.

The OLE DB (OLE for Databases) for data mining specification is a high level standard for implementing standalone data mining providers that expose their functionality using standard OLE DB interfaces in conjunction with additional schema rowsets for publishing metadata and an SQL-like language known as DMX (Data Mining extensions) for creating, processing and querying mining models. In one implementation, the new syntax introduced herein is an extension to the DMX language for mining models. The OLE DB specification already allows for parameter of type VARIANT to be used in statements. A rowset parameter can be represented as such a VARIANT typed parameter, with the following restrictions: the type of the variant should be VT_UNKNOWN, and the value of the variant should contain a valid pointer to a COM (Component Object Model) IUnknown interface which can be successfully queried (via standard COM QueryInterface) for the IRowset OLE DB interface.

Figure 5:
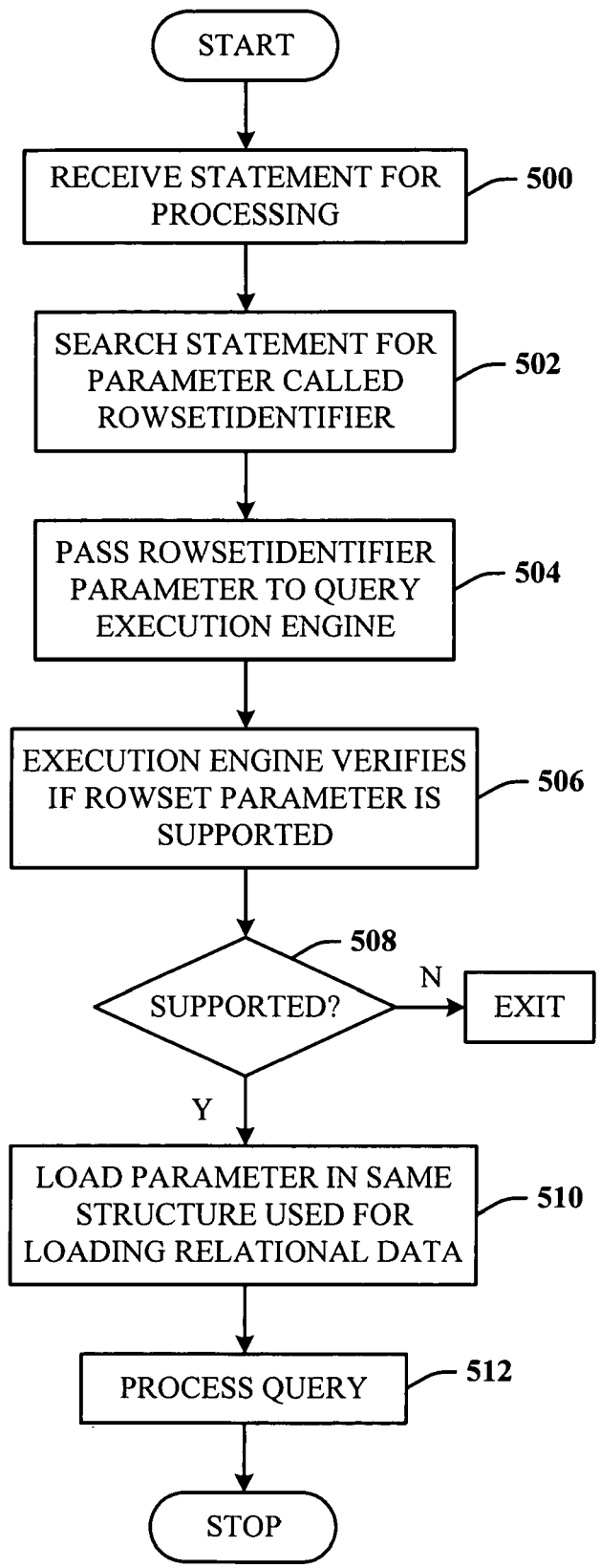
FIG. 5 illustrates a methodology of server-side processing of a query that includes a rowset parameter in accordance with the invention.

FIG. 5 illustrates a methodology of server-side processing of a query that includes a rowset parameter in accordance with the invention. At 500, a statement is received for processing. Continuing with the sample statement from above, upon receiving such a statement, the server looks in the list of parameters of the statement for the parameter named "RowsetIdentifier", as indicated at 502. At 504, the RowsetIdentifier parameter is passed to a query execution engine. At 506, the execution engine verifies if the rowset parameter is supported in the respective position of the current statement. If not, at 508, the process exits. Otherwise, flow proceeds from 508 to 510, where the parameter is loaded in the same structure used for loading relational data in the case of the alternative OPENROWSET syntax that requires data source access. This way, the rest of the query execution can go ahead without any knowledge of the fact that a rowset parameter was used instead of a relational statement. The query is then processed, as indicated at 512.

Figure 6:
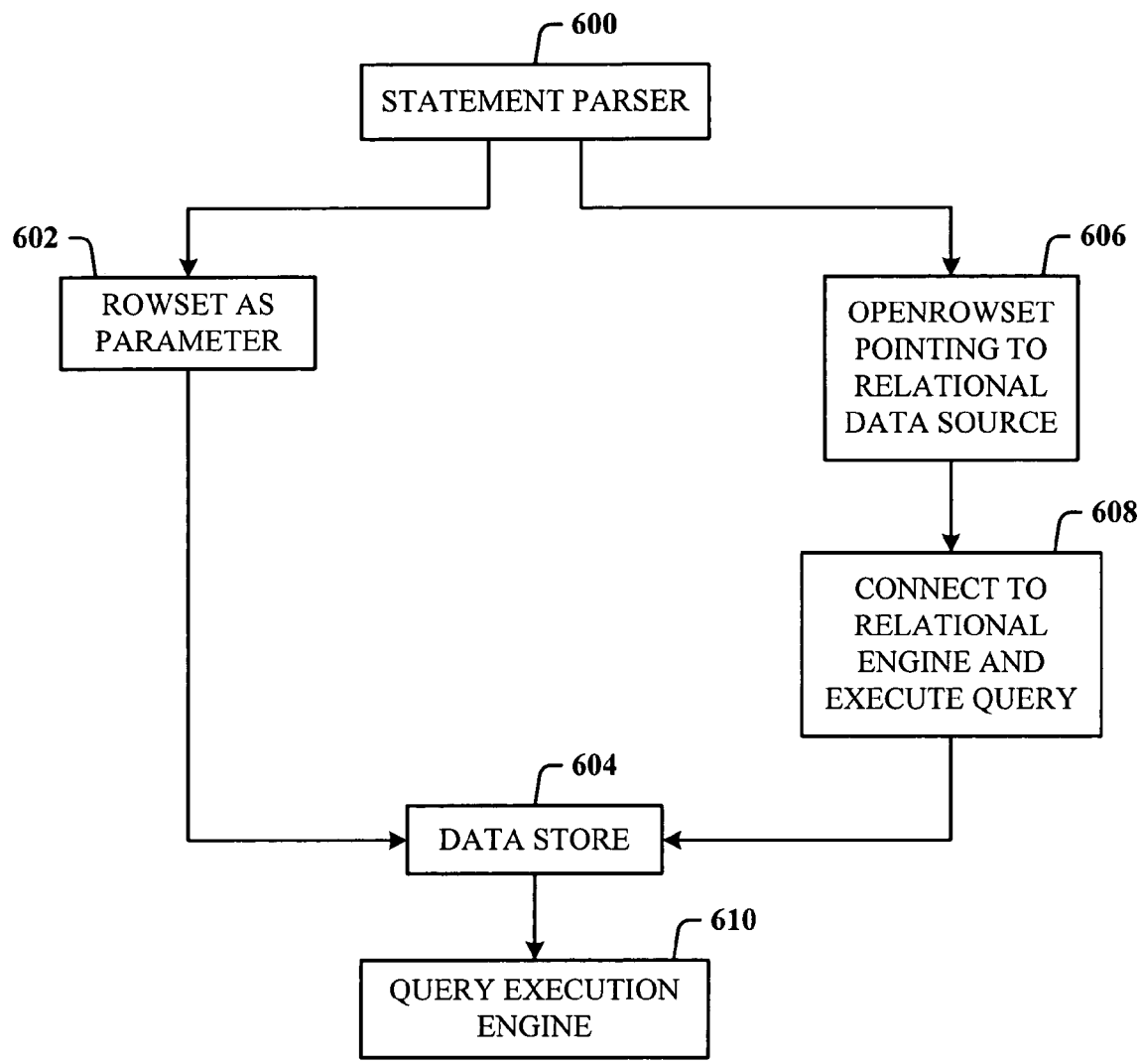
FIG. 6 illustrates a process of new and legacy handling of rowset parameters and OPENROWSET in a server in accordance with the invention.

FIG. 6 illustrates a process of new and legacy handling of rowset parameters and OPENROWSET in a server in accordance with the invention. At 600, the received statement is parsed with a parser. At 602, the rowset parameter is detected, and a new execution mechanism is employed. Data is then loaded directly from the body of the statement to the data store, at 604. When detecting an OPENROWSET parameter, the data source access execution mechanism is to connect to a relational engine and fetch the data. Accordingly, at 606, the OPENROWSET parameter points to the relational data source. At 608, connection is made to the relational engine, and the query is executed. In either case, the query engine at 610 processes the statements.

Figure 7:
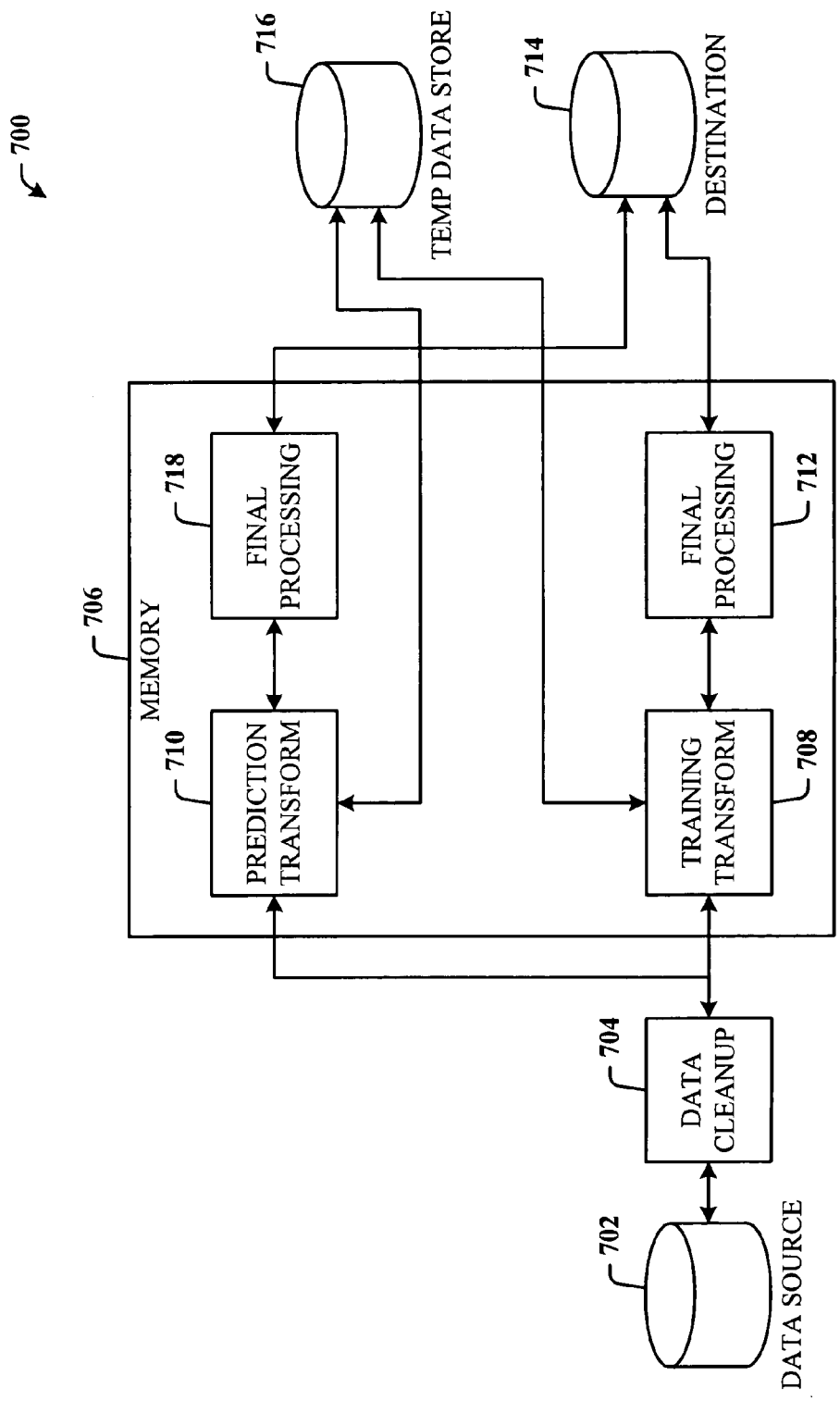
FIG. 7 illustrates a pipelined transform implementation is provided in accordance with the invention.

Referring now to FIG. 7, a pipelined transform implementation 700 is provided in accordance with the invention. A different scenario involves an integration services system (e.g., SQL Server Integration Services by Microsoft Corporation), which acts as a pipeline. The starting point is with the data, followed by initiation of various operations on the data, e.g., creating a new column that is the sum of other columns, getting a sample out of the data or, enhancing or cleaning that data in any form. As part of this pipeline, it may be desirable that the resulting data be pushed into an analysis services server (server 302 of FIG. 3) that finds the rules governing the distribution of values in that data. In this scenario, a rowset-specific requirement is imposed; however, the statement used for initiating the processing command is different. That is, there is no way to do an insert.

What is accomplished with the pipeline implementation 700 is extracting data out of a data source 702 for processing. For example, it may be desired to build a database on top of the data source 702, or a cube, or using business intelligent applications on top of that data. A data cleanup component 704 cleans the data from the data source 702 to, for example, determine if there are missing values, wrong values, etc. The output of data cleanup 704 is passed into a memory 706 where one or more transforms reside. Note that the memory 706 can be a single memory or separate memories in which each of the transforms operate. Each transform is a bundle of code. The one or more transforms function to read data, process it, and write it out. Thus, the data is pushed into this pipeline of transforms where the data is processed and pushed out. Complicated pipelines can be constructed that have branches and can branch part of the data to a side branch, and to other processes. Here, the pipeline includes a training transform 708 and a prediction transform 710.

Essentially, the data coming into the pipeline system 700 is constructed either as a model, or if already built, the data is trained. This means that data is taken from the pipeline, rather than from the data source 702. The training transform 708 of the memory 706 receives the cleaned-up data 704, and passes the transform output to a first final processing block 712, and then on to a destination data store 714. The training transform 708 also interfaces directly to a temporary data store 716 for temporary data storing during training. The prediction transform 710 receives cleaned-up data, performs prediction processing on the data, and passes the prediction output data to a second final processing stage 718. The output of the second final processing stage 718 can also be passed to the destination 714. The prediction transform 710 also interfaces directly to the temporary data store 716.

The idea is to package the data as a rowset parameter and pass it on for final processing (e.g., execution) against the destination data store 714. Data can be taken from the end of this the pipeline, converted into a rowset parameter, and passed on without caring about its source. With prediction, input can be column information of many different attributes, e.g., age, gender, etc., and using the novel mining model, a new column called predicted college plans can be created. Additionally, the pipeline facilitates multiprocessing such that while one piece of data has been passed on from the training transform 708, the prediction transform 710 can be processing data as the training transform 708 begins with new data.

Figure 8:
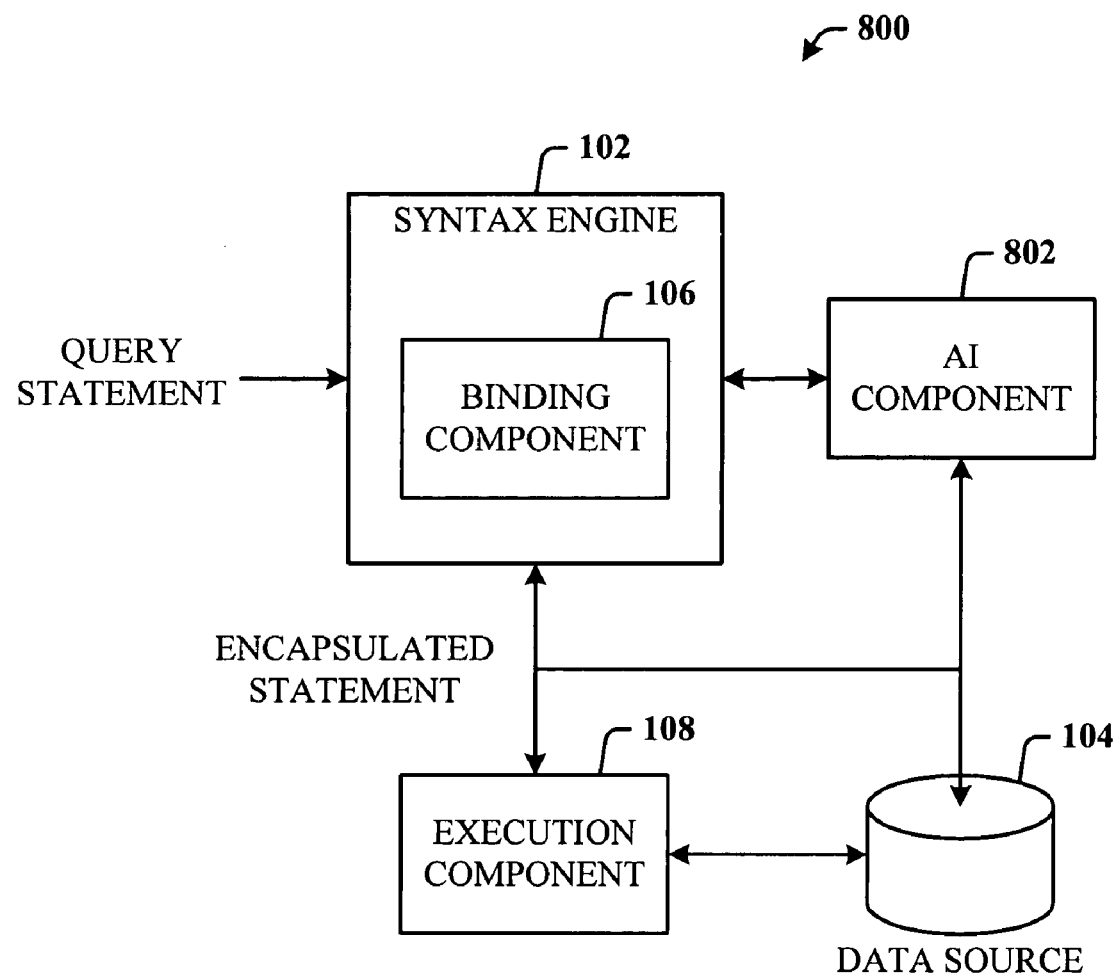
FIG. 8 illustrates a system that employs artificial intelligence which facilitates automating one or more features in accordance with the subject invention.

FIG. 8 illustrates a system 800 that employs artificial intelligence (AI) which facilitates automating one or more features in accordance with the subject invention. The system includes an AI component 802 that can interface to the syntax engine 102 (thereby also communicating with the binding component 106), execution component 108 and the data source 104 for accessing data and other information. The subject invention (e.g., in connection with statement processing) can employ various AI-based schemes for carrying out various aspects thereof. For example, a process for sending a request and surveying a template of all support statements can be facilitated via an automatic classifier system and process. Moreover, where the statement syntax can be automatically presented.

A classifier is a function that maps an input attribute vector, $x=(x1, x2, x3, x4, xn)$, to a confidence that the input belongs to a class, that is, $f(x)=\text{confidence}(\text{class})$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to receiving a sample parameter, and then determining where the parameter should be placed in the statement.

It is to be appreciated that the novel syntax of the subject invention can be employed to facilitate the passing of data and data parameters via the statement through a data cube. Additionally, the disclosed architecture is not limited to an OLE DB environment, but finds application to a .NET environment, Java, ADO.NET, and other types of environments.

In general, the inventive architecture applies to a relational algebra. However, the invention contemplates replacing any subselect statement with this rowset parameter or tabular returning parameter. Even though the parameter value is of some kind of tabular representation, the actual source data need not be some tabular representation. For example, it could be some RSX via XML that somehow gets transformed into a tabular mechanism that gets used. RSX (a Runtime addressSpace eXtender) provides on-the-fly code remapping of existing Linux binaries, to implement a non-executable stack and short/long heap areas. RSX targets common buffer-overflow problems preventing code execution in mapped data-only areas.

Figure 9:
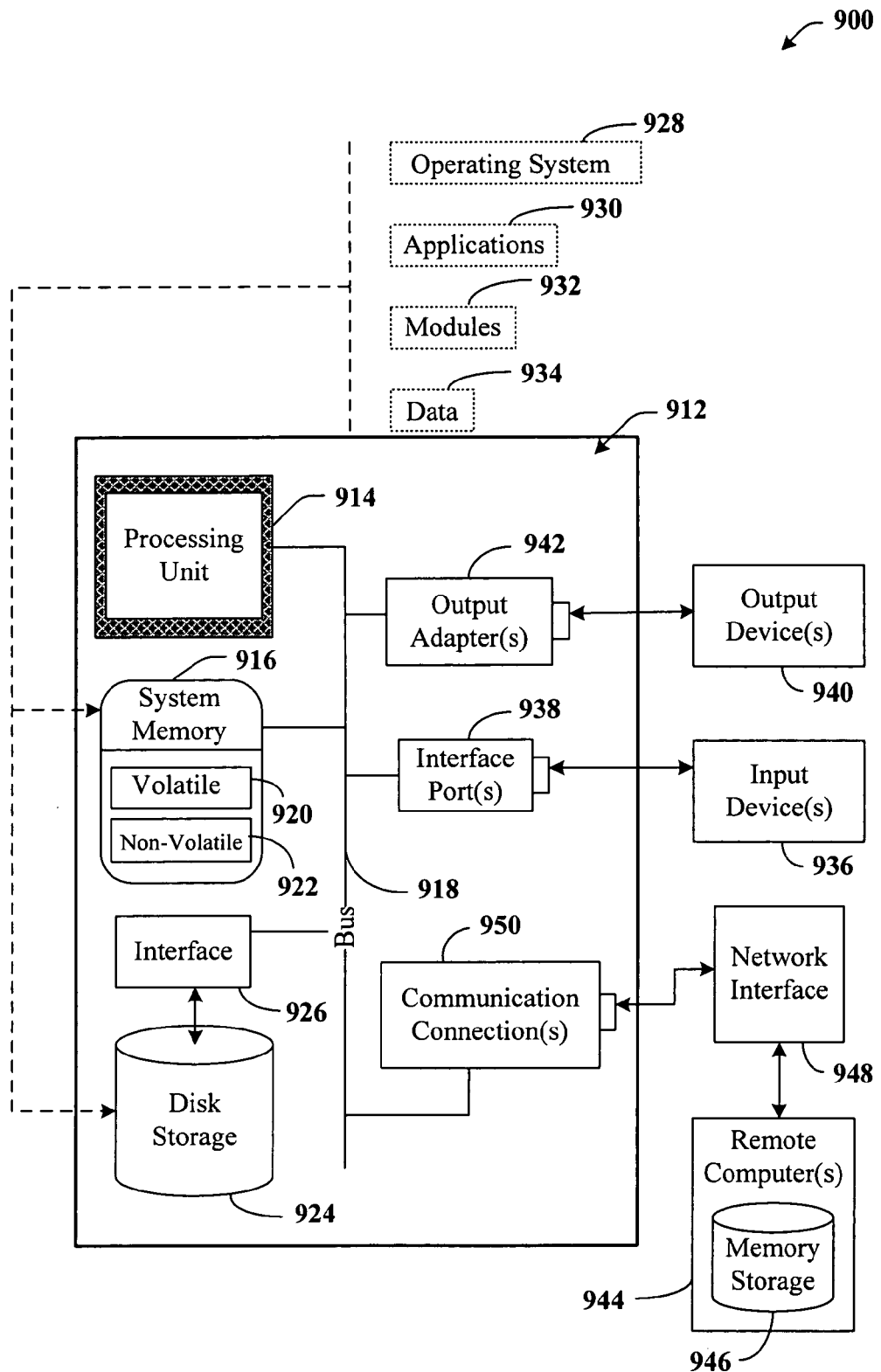
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject invention, FIG. 9 and the following discussion are intended to provide a brief, general description of a suitable computing environment 900 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage medium and communication media. Computer storage medium includes both volatile and nonvolatile storage medium, removable and non-removable storage medium implemented in any method or technology for storage of information such as computer readable instructions, data structures, program modules or other data. Computer storage medium includes, but is not limited to, RAM, ROM, EEPROM, flash memory or other memory CD-ROM, digital video disk (DVD) or other optical disk storage, magnetic cassettes, magnetic tape, magnetic disk storage or other magnetic storage devices, which are used to store the desired information and which is accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary computing environment 900 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in non-volatile memory 922. By way of illustration, and not limitation, non-volatile memory 922 can include read-only memory (ROM), programmable ROM (PROM), electrically programmable ROM (EPROM), electrically erasable ROM (EEPROM), and/or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example, disk storage 924 that includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that the computing environment 900 of FIG. 9 describes software that acts as an intermediary between users and the basic computer resources described in the suitable computing environment 900. Such software includes an operating system 928. Operating system 928, which can be stored on disk storage 924, acts to control and allocate resources of the computer system 912. System applications 930 take advantage of the management of resources by operating system 928 through program modules 932 and program data 934 stored in system memory 916 and/or on disk storage 924. It is to be appreciated that the invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, IEEE 1394 port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, for example, that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
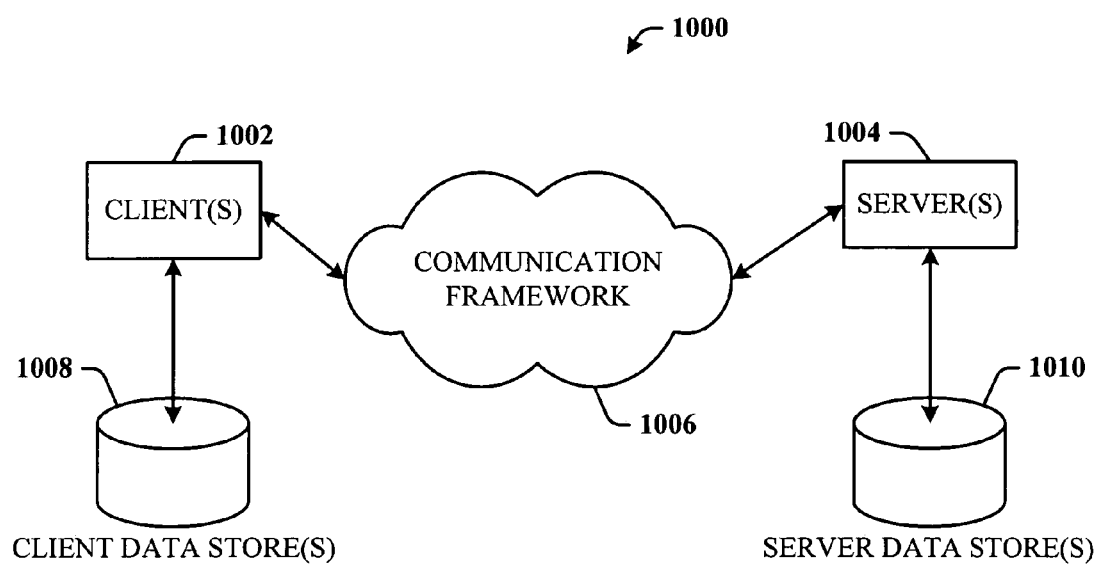
FIG. 10 illustrates a schematic block diagram of an exemplary computing environment in accordance with the subject invention.

Referring now to FIG. 10, there is illustrated a schematic block diagram of an exemplary computing environment 1000 in accordance with the subject invention. The system 1000 includes one or more client(s) 1002. The client(s) 1002 can be hardware and/or software (e.g., threads, processes, computing devices). The client(s) 1002 can house cookie(s) and/or associated contextual information by employing the invention, for example.

The environment 1000 also includes one or more server(s) 1004. The server(s) 1004 can also be hardware and/or software (e.g., threads, processes, computing devices). The servers 1004 can house threads to perform transformations by employing the invention, for example. One possible communication between a client 1002 and a server 1004 can be in the form of a data packet adapted to be transmitted between two or more computer processes. The data packet may include a cookie and/or associated contextual information, for example. The environment 1000 includes a communication framework 1006 (e.g., a global communications network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system that facilitates querying a data store, comprising a processor and computer readable storage medium having stored thereon components:
    a component receiving a query statement from a client;
    at the client, converting the query statement into an encapsulated statement by processing the query statement with embedded rowset parameters and binding corresponding data structures to sections of data represented by the rowset parameters, the encapsulated statement includes encapsulated data and data operations information in a form of the rowset parameters, wherein the rowset parameters include a polymorphic typed parameter that comprises a valid pointer to an interface;
    a component replacing OPENROWSET description of a relational connection with syntax for operating the data to an analysis server, the data is in-lined in the query statement queries with rowsets as parameters;
    a component passing the encapsulated statement to the analysis server;
    a component inputting the encapsulated statement into a transform pipeline for processing against the data store;
    a execution component executing the encapsulated statement against the data store to return a result set such that data to be loaded into the data store is in-lined in the query statement, wherein execution of the query statement is accomplished without knowledge that the parameter was employed in place of a relational statement;
    a component searching the encapsulated statement for parameter named rowsetidentifier;
    a component verifying if the rowsetidentifer of the encapsulated statement is supported for execution against the data store, loading a parameter of the encapsulated statement into a same data structure used for loading relational data;
    a component loading the result set into the data store operatively coupled to the analysis server; and
    a component processing one or more of training or modeling statements by the server against the result set loaded into the data store.

2. The system of claim 1, wherein a database operation includes generation of a prediction.

3. The system of claim 1, wherein data related to a parameter is employed in at least one or more of a prediction process relating to the data and or training process relating to the data.

4. The system of claim 3, wherein the data related to the parameter included in a data mining query.

5. The system of claim 1 is implemented in an OLE DB (Object Linking and Embedding for Database) environment.

6. The system of claim 1, wherein the query statement that includes a parameter is passed to a server for execution by the server against a database to return a result set.

7. The system of claim 1, further comprising a query execution engine that analyzes a list of acceptable parameters and verifies that the parameter is supported with respect to a position of the parameter.

8. The system of claim 1, wherein a parameter is a unknown variant type that holds a valid pointer to an interface that can be queried for information regarding a rowset.

9. A computer-readable storage medium having computer-executable instructions for querying a data store, comprising:
    receiving a query statement from a client;
    at the client, converting the query statement into an encapsulated statement by processing the query statement with embedded rowset parameters and binding corresponding data structures to sections of data represented by the rowset parameters, the encapsulated statement includes encapsulated data and data operations information in a form of the rowset parameters, wherein the rowset parameters include a polymorphic typed parameter that comprises a valid pointer to an interface;
    replacing OPENROWSET description of a relational connection with syntax for operating the data to an analysis server, the data is in-lined in the query statement queries with rowsets as parameters;
    passing the encapsulated statement to the analysis server;
    inputting the encapsulated statement into a transform pipeline for processing against the data store;
    executing the encapsulated statement against the data store to return a result set such that data to be loaded into the data store is in-lined in the query statement, wherein execution of the query statement is accomplished without knowledge that the parameter was employed in place of a relational statement;
    searching the encapsulated statement for parameter named rowsetidentifier;

verifying if the rowsetidentifer of the encapsulated statement is supported for execution against the data store, loading a parameter of the encapsulated statement into a same data structure used for loading relational data;

loading the result set into the data store operatively coupled to the analysis server; and processing one or more of training or modeling statements by the server against the result set loaded into the data store.

10. The medium of claim 9, the method further comprising verifying if syntax of the encapsulated statement is supported for execution against the data store.

11. The medium of claim 9, the method further comprising: processing a rowset as one of the parameters.

12. A method for querying a data store, the method comprising:

receiving a query statement from a client;

at the client, converting the query statement into an encapsulated statement by processing the query statement with embedded rowset parameters and binding corresponding data structures to sections of data represented by the rowset parameters, the encapsulated statement includes encapsulated data and data operations information in a form of the rowset parameters, wherein the rowset parameters include a polymorphic typed parameter that comprises a valid pointer to an interface;

replacing OPENROWSET description of a relational connection with syntax for operating the data to an analysis server, the data is in-lined in the query statement queries with rowsets as parameters;

passing the encapsulated statement to the analysis server;

inputting the encapsulated statement into a transform pipeline for processing against the data store;

executing the encapsulated statement against the data store to return a result set such that data to be loaded into the data store is in-lined in the query statement, wherein execution of the query statement is accomplished without knowledge that the parameter was employed in place of a relational statement;

searching the encapsulated statement for parameter named rowsetidentifier;

verifying if the rowsetidentifer of the encapsulated statement is supported for execution against the data store, loading a parameter of the encapsulated statement into a same data structure used for loading relational data;

loading the result set into the data store operatively coupled to the analysis server; and processing one or more of training or modeling statements by the server against the result set loaded into the data store.

\* \* \* \* \*